(12) United States Patent
Inaba et al.

(10) Patent No.: US 11,755,019 B2
(45) Date of Patent: Sep. 12, 2023

(54) VEHICLE CONTROL DEVICE AND VEHICLE CONTROL SYSTEM

(71) Applicant: Hitachi Automotive Systems, Ltd., Hitachinaka (JP)

(72) Inventors: Ryoh Inaba, Tokyo (JP); Naoyuki Tashiro, Tokyo (JP); Tsutomu Kaneko, Hitachinaka (JP); Katsuro Watanabe, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 387 days.

(21) Appl. No.: 16/981,909

(22) PCT Filed: Mar. 6, 2019

(86) PCT No.: PCT/JP2019/008760
§ 371 (c)(1),
(2) Date: Sep. 17, 2020

(87) PCT Pub. No.: WO2019/181492
PCT Pub. Date: Sep. 26, 2019

(65) Prior Publication Data
US 2021/0116926 A1  Apr. 22, 2021

(30) Foreign Application Priority Data
Mar. 20, 2018  (JP) ................... 2018-053173

(51) Int. Cl.
*G05D 1/02*     (2020.01)
*G07C 5/00*     (2006.01)
(Continued)

(52) U.S. Cl.
CPC ......... *G05D 1/0214* (2013.01); *G05D 1/0276* (2013.01); *G07C 5/008* (2013.01);
(Continued)

(58) Field of Classification Search
CPC .... G05D 1/0214; G05D 1/0276; G07C 5/008; G07C 5/0808; G08G 1/0968; G08G 1/14; G08G 1/146; B60W 30/06
See application file for complete search history.

(56) References Cited

U.S. PATENT DOCUMENTS

| | | | |
|---|---|---|---|
| 2002/0084915 A1* | 7/2002 | Budnovitch | G08G 1/14 340/901 |
| 2016/0321929 A1* | 11/2016 | Nordbruch | G08G 1/141 |

(Continued)

FOREIGN PATENT DOCUMENTS

| | | |
|---|---|---|
| JP | 2010-164349 A | 7/2010 |
| JP | 2016-38689 A | 3/2016 |

(Continued)

OTHER PUBLICATIONS

International Search Report (PCT/ISA/210) issued in PCT Application No. PCT/JP2019/008760 dated Jun. 18, 2019 with English translation (five pages).

(Continued)

Primary Examiner — Rodney A Butler
(74) Attorney, Agent, or Firm — Crowell & Moring LLP

(57) ABSTRACT

There are provided a vehicle control device and a vehicle control system capable of improving efficiency and reliability of auto valet parking compared to the related art when a communication failure occurs. A vehicle control device mounted on a vehicle includes a recognition unit, an estimation unit, a communication unit, a determination unit, a trajectory generation unit, a vehicle control unit, and a retreated position decision unit. When the determination unit determines that communication of the communication unit is abnormal, the trajectory generation unit generates a target trajectory along which the vehicle drives to a retreated position decided by the retreated position decision unit.

7 Claims, 6 Drawing Sheets

(51) Int. Cl.
  *G08G 1/09*      (2006.01)
  *G08G 1/14*      (2006.01)
  *G08G 1/0968*    (2006.01)
  *G07C 5/08*      (2006.01)

(52) U.S. Cl.
  CPC ............ *G08G 1/0968* (2013.01); *G08G 1/14* (2013.01); *G07C 5/0808* (2013.01)

(56) References Cited

U.S. PATENT DOCUMENTS

| | | |
|---|---|---|
| 2017/0153644 A1 | 6/2017 | Otsuka et al. |
| 2018/0018876 A1 | 1/2018 | Kumabe |

FOREIGN PATENT DOCUMENTS

| | | |
|---|---|---|
| JP | 2016-144076 A | 8/2016 |
| JP | 2017-47835 A | 3/2017 |

OTHER PUBLICATIONS

Japanese-language Written Opinion (PCT/ISA/237) issued in PCT Application No. PCT/JP2019/008760 dated Jun. 18, 2019 (four pages).

\* cited by examiner

VEHICLE CONTROL DEVICE AND VEHICLE CONTROL SYSTEM

TECHNICAL FIELD

The present invention relates to a vehicle control device and a vehicle control system.

BACKGROUND ART

In the related art, an invention related to a vehicle communication device that determines an abnormality of a short-range communication unit has been known (see PTL 1 below). The vehicle communication device described in PTL 1 is used in a vehicle, and includes a reception unit, a reference value setting unit, an acquisition unit, and an abnormality determination unit (see PTL 1 and claim 1).

The reception unit receives a communication performance index indicating the performance of the short-range communication unit from a peripheral vehicle including the short-range communication unit. The reference value setting unit sequentially sets a reference value serving as a reference of the communication performance index based on communication performance indexes received by the reception unit from a plurality of peripheral vehicles. The acquisition unit acquires the communication performance index of the target short-range communication unit that is the short-range communication unit as an abnormality determination target. The abnormality determination unit determines an abnormality of the target short-range communication unit based on the comparison of the reference value set by the reference value setting unit with the communication performance index of the target short-range communication unit acquired by the acquisition unit.

In the vehicle communication device of the related art, the reference value set by the reference value setting unit is set from communication performance indexes acquired from the plurality of peripheral vehicles, and communication environments of the peripheral vehicles are similar to each other. Thus, when the communication performance of the target short-range communication unit changes due to the influence of the communication environment, the reference value also changes according to the communication environment (see PTL 1 at paragraph 0009).

The abnormality determination of the target short-range communication unit is performed based on the comparison of the reference value with the communication performance index of the target short-range communication unit. Thus, a case where the communication performance index of the target short-range communication unit has an abnormal value due to the abnormality of the target short-range communication unit and a case where the target short-range communication unit is not abnormal and the target short-range communication unit is influenced by the communication environment and the communication performance index of the target short-range communication unit has an abnormal value can be accurately distinguished. Accordingly, it is possible to accurately determine the abnormality of the target short-range communication unit (see PTL 1 at paragraph 0010).

CITATION LIST

Patent Literature

PTL 1: JP 2016-144076 A

SUMMARY OF INVENTION

Technical Problem

Autonomous vehicles capable of performing autonomous driving have been developed, and auto valet parking for the autonomous vehicles has been studied. In the auto valet parking, for example, communication is performed between a management center that manages a parking lot and the autonomous vehicle, and the autonomous vehicle automatically moves into a designated parking position by the autonomous driving or automatically moves out from a parking position.

However, there is a concern that a failure occurs in communication between the management center and the autonomous vehicle when the autonomous vehicle moves in and out from the parking lot. In such a case, in the vehicle communication device of the related art, the abnormality of the communication unit can be determined, but the designated parking position cannot be determined. Thus, there is a concern that the autonomous driving of the autonomous vehicle is hindered. For example, in the management center, the position of the vehicle in which the communication failure occurs cannot be confirmed, and the moving-in and -out of other vehicles are restricted. Thus, there is a concern that efficiency and reliability of the auto valet parking deteriorate.

The present disclosure provides a vehicle control device and a vehicle control system capable of improving efficiency and reliability of auto valet parking compared to the related art when a communication failure occurs.

Solution to Problem

An aspect of the present disclosure is a vehicle control device mounted on a vehicle. The vehicle control device includes a recognition unit that recognizes a driving environment around the vehicle, an estimation unit that estimates a position of the vehicle based on the driving environment, a communication unit that communicates with an external facility of the vehicle, a determination unit that determines whether or not a failure occurs in the communication, a trajectory generation unit that generates a target trajectory along which the vehicle autonomously drives, a vehicle control unit that causes the vehicle to drive along the target trajectory, and a retreated position decision unit that decides a retreated position of the vehicle based on the communication and the driving environment, wherein the trajectory generation unit generates the target trajectory along which the vehicle drives to the retreated position when the determination unit determines that the communication is abnormal.

Advantageous Effects of Invention

According to the present disclosure, it is possible to provide the vehicle control device and the vehicle control system capable of improving the efficiency and reliability of the auto valet parking compared to the related art when the communication failure occurs.

DESCRIPTION OF EMBODIMENTS

Hereinafter, embodiments of a vehicle control device and a vehicle control system according to the present disclosure will be described with reference to the drawings.

First Embodiment

Figure 1:
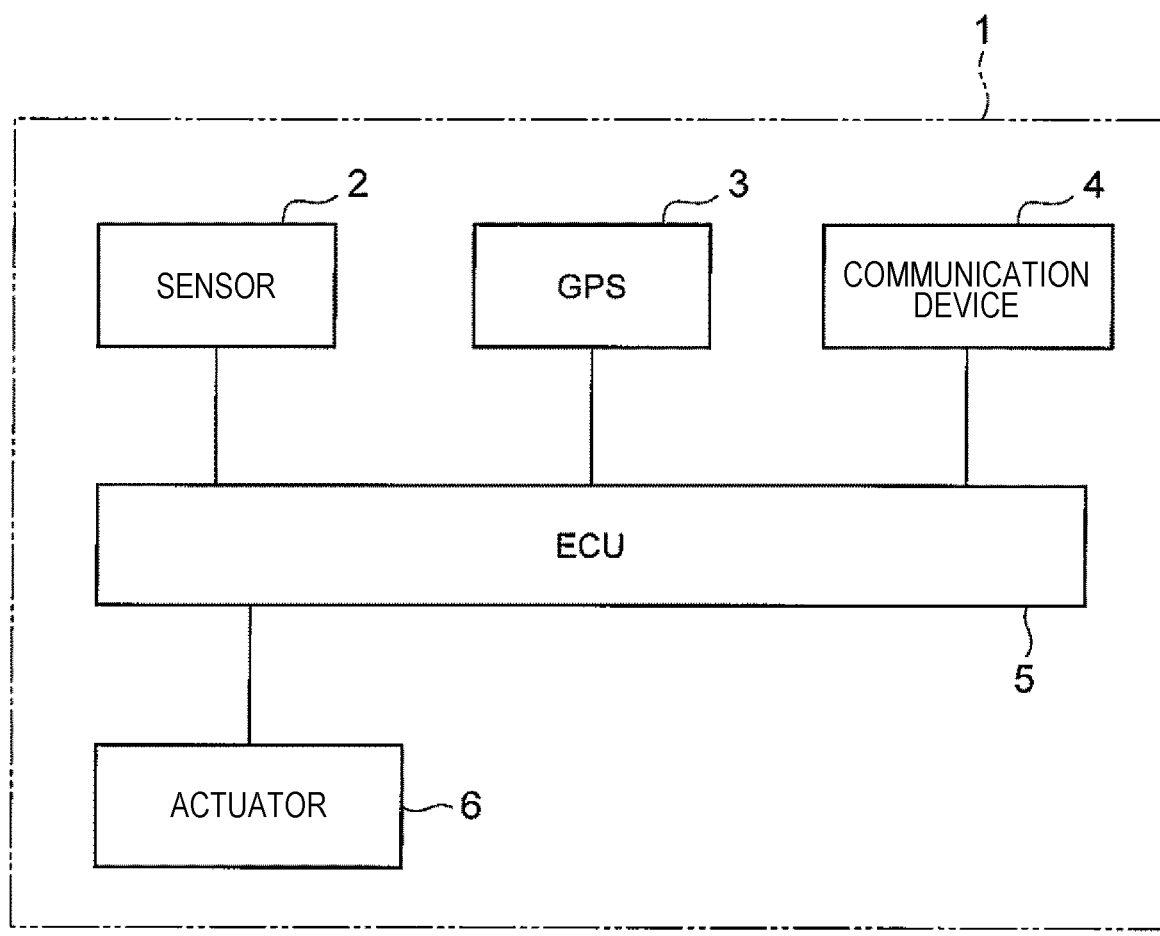
FIG. 1 is a block diagram illustrating an example of a configuration of a vehicle.

FIG. 1 is a block diagram illustrating an example of a configuration of a vehicle 1 having the vehicle control device according to the embodiment of the present disclosure mounted thereon. The vehicle 1 is, for example, an autonomous vehicle capable of performing autonomous driving, and includes various sensors 2, a global positioning system (GPS) 3, a communication device 4, an electrical control unit (ECU) 5, and various actuators 6.

The sensor 2 includes, for example, a monocular camera, a stereo camera, an ultrasonic sensor, a radar, a Laser Imaging Detection and Ranging (LIDAR), a vehicle speed sensor, an acceleration sensor, an angular acceleration sensor, an accelerator opening degree sensor, a brake sensor, and a steering sensor. The GPS 3 includes, for example, an in-vehicle GPS including a GPS antenna, a GPS receiver, map information, and road information.

The communication device 4 is, for example, a wireless communication device used for communication between the vehicle 1 and a management center through road-to-vehicle communication or a wireless base station, and includes transmission and reception antennas and transmission and reception devices. The ECU 5 is, for example, a control unit that includes a computer unit including a storage device such as a RAM and a ROM and a central processing unit (CPU) and performs control of the vehicle 1 including autonomous driving.

The actuator 6 includes, for example, an accelerator actuator, a brake actuator, and a steering actuator. For example, the actuator 6 automatically operates an accelerator, a brake, and a steering wheel of the vehicle 1 in order to cause the vehicle 1 to autonomously drive under the control of the ECU 5.

Figure 2:
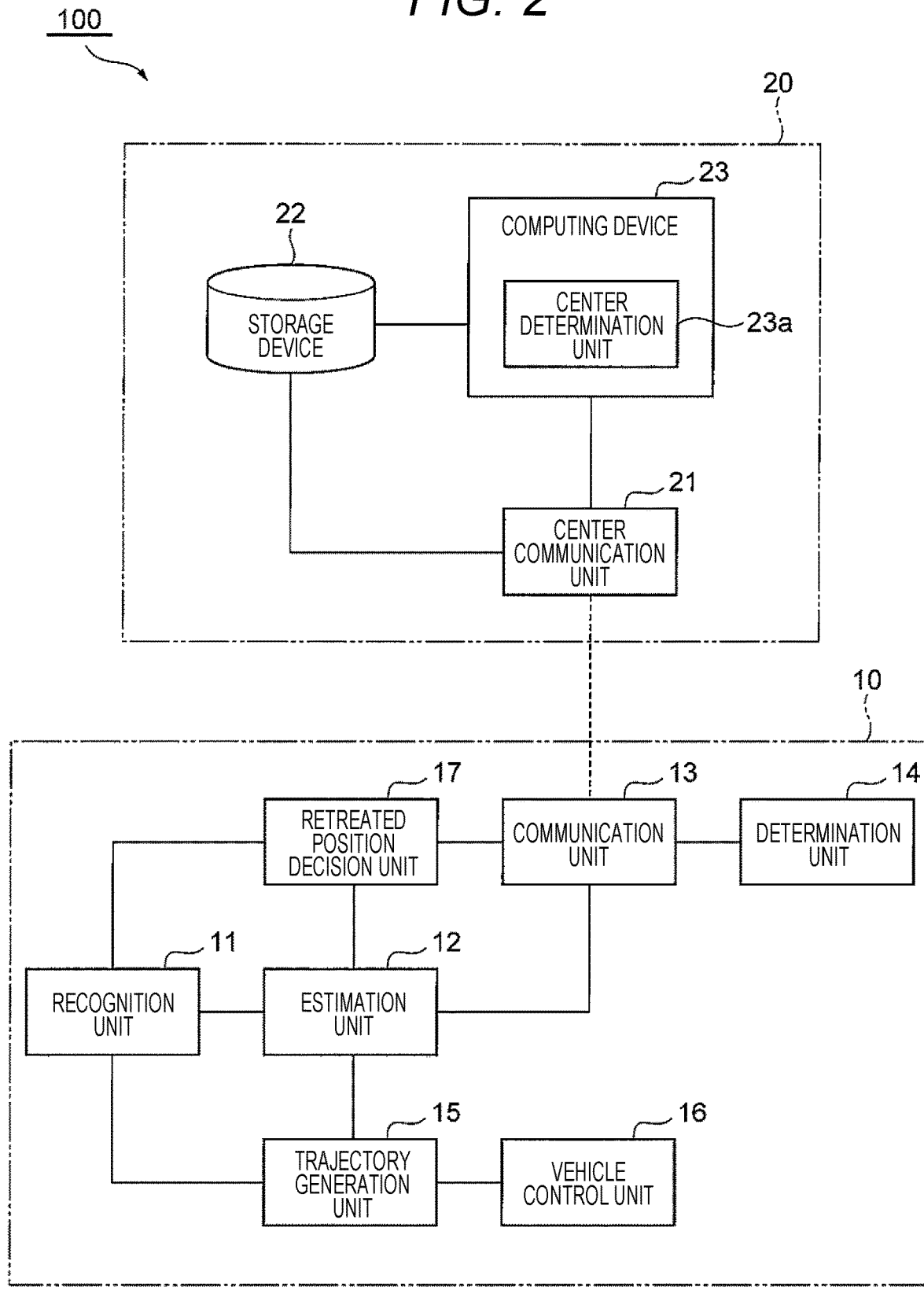
FIG. 2 is a block diagram of a vehicle control device and a vehicle control system according to a first embodiment.

FIG. 2 is a block diagram illustrating a schematic configuration of a vehicle control device 10 and a vehicle control system 100 according to the first embodiment of the present disclosure. Although details will be described below, the vehicle control device 10 and the vehicle control system 100 according to the present embodiment each have the following features.

The vehicle control device 10 is a device mounted on the vehicle 1 that is the autonomous vehicle, and includes a recognition unit 11, an estimation unit 12, a communication unit 13, a determination unit 14, a trajectory generation unit 15, a vehicle control unit 16 and a retreated position decision unit 17. The recognition unit 11 recognizes a driving environment around the vehicle 1. The estimation unit 12 estimates a position of the vehicle 1 based on the driving environment thereof. The communication unit 13 communicates with a management center 20 which is an external facility of the vehicle 1. The determination unit 14 determines whether or not a communication failure occurs. The trajectory generation unit 15 generates a target trajectory along which the vehicle 1 autonomously drives. The vehicle control unit 16 causes the vehicle 1 to drive along the target trajectory. The retreated position decision unit 17 decides a retreated position of the vehicle 1 based on the communication with the management center 20 and the driving environment recognized by the recognition unit 11. When the determination unit 14 determines that the communication is abnormal, the trajectory generation unit 15 generates the target trajectory along which the vehicle 1 drives to the retreated position.

The vehicle control system 100 includes the vehicle control device 10 mounted on the vehicle 1, and the management center 20 that manages the vehicle 1. The management center 20 includes a center communication unit 21 that communicates with the communication unit 13 of the vehicle control device 10, a storage device 22 that has map information of a parking lot PA (see FIG. 3) at which the vehicle 1 moves in and out, and a computing device 23 that decides a parking position of the vehicle 1. Hereinafter, configurations of the vehicle control device 10 and the vehicle control system 100 according to the present embodiment will be described in detail.

First, each configuration of the vehicle control device will be described in detail. The recognition unit 11 includes, for example, the sensor 2 and the ECU 5 mounted on the vehicle 1. For example, the recognition unit 11 is configured to recognize, for example, the driving environment around the vehicle 1 including shapes, sizes, positions, moving directions, and moving speeds of roads, paths, white lines, signs, signals, other vehicles, pedestrians, buildings, and obstacles around the vehicle 1. For example, the recognition unit 11 is configured to recognize information of the vehicle 1 on which the vehicle control device 10 is mounted, that is, information of the host vehicle, such as a speed, an acceleration, an angular acceleration, an accelerator opening degree, a brake pressure, and a steering angle of the vehicle 1.

The estimation unit 12 includes, for example, the sensor 2, the GPS 3, and the ECU 5 mounted on the vehicle 1. The estimation unit 12 is configured to estimate the position of the vehicle 1 based on the driving environment recognized by the recognition unit 11. The estimation unit 12 is configured to estimate a current position of the vehicle 1 based on, for example, map information, road information, and a positioning result obtained by the GPS 3. The estimation unit 12 is configured to estimate the current position of the vehicle 1 based on, for example, information received from the management center 20 via the communication unit 13 and the driving environment recognized by the recognition unit 11.

The communication unit 13 includes, for example, the communication device 4 and the ECU 5 mounted on the vehicle 1. The communication unit 13 is configured to communicate with the management center 20 which is an external facility of the vehicle 1. More specifically, for example, the vehicle control device 10 receives map information and empty vehicle information of the parking lot PA (see FIG. 3) at which the vehicle 1 moves in and out, and information of the decided parking position of the vehicle 1 from the management center 20 via the communication unit 13. For example, the vehicle control device 10 transmits information such as a driving environment, a position, a speed, an acceleration, and an angular acceleration of the vehicle 1, and information on the retreated position of the vehicle 1 decided by the retreated position decision unit 17 to the management center 20 via the communication unit 13. The external equipment with which the communication unit 13 communicates is not limited to the management center 20, and may be, for example, a vehicle monitoring system provided in the parking lot PA (see FIG. 3).

For example, the communication unit 13 is configured to shorten a communication period at an intersection XPT (see FIG. 3) of paths P1, P2, P3, P4, and P5 along which the vehicle 1 drives. For example, a self-propelling parking lot PA (see FIG. 3) such as a flat parking lot or a multi-story parking lot has usually a plurality of parking sections B1 and B2. Each of the parking sections B1 and B2 has a plurality of parking frames b11, . . . , and b26, and one vehicle 1 is parked in each of the parking frames b11, . . . , and b26.

In the parking lot PA having the plurality of parking sections B1 and B2, while the vehicle 1 is autonomously driving within the parking lot PA, the parking position of the vehicle 1 may be changed from an initially designated parking section B1 to the other parking section B2 by the management center 20. In such a case, for example, the communication unit 13 may be configured to shorten the period of the communication from at a time when the vehicle 1 which is autonomously driving along a certain parking section B1 reaches an edge of the parking section B1 to a time when this vehicle moves to a driving route along the next parking section B2.

The determination unit 14 includes, for example, the communication device 4 and the ECU 5 mounted on the vehicle 1. The determination unit 14 is configured to determine whether or not there is a communication failure of the communication unit 13. More specifically, the determination unit 14 determines whether or not the communication failure of the communication unit 13 occurs by detecting an abnormal signal of the communication device 4 of the vehicle 1. For example, the determination unit 14 is configured to determine whether or not the communication failure of the communication unit 13 occurs by detecting an electromagnetic interference between the management center 20 and the communication unit 13 of the vehicle control device 10. Here, the electromagnetic interference includes a null point generated when a direct wave and an interference wave overlap each other at a reception point in opposite phases and cancel each other.

For example, the determination unit 14 is configured to shorten a period of determination of whether a communication failure between the communication unit 13 and the management center 20 occurs at the intersection XPT (see FIG. 3) of the paths P1, P2, P3, P4, and P5 at which the vehicle 1 drives. For example, the determination unit 14 can be configured to shorten the period of the determination from a time when the vehicle 1 that is autonomously driving along a certain parking section B1 reaches the edge of the parking section B1 to a time when the vehicle moves to the driving route along the next parking section B2 in the parking lot PA having the plurality of parking sections B1 and B2 as described above.

The trajectory generation unit 15 includes, for example, the ECU 5 mounted on the vehicle 1. The trajectory generation unit 15 generates a target trajectory along which the vehicle autonomously drives. More specifically, the trajectory generation unit 15 is configured to generate a target trajectory along which the vehicle 1 autonomously drives from the current position to the parking position based on the map information of the parking lot PA received from the management center 20 via the communication unit 13 and the decided parking position of the vehicle 1.

When the determination unit 14 determines that the communication between the communication unit 13 and the management center 20 is abnormal, the trajectory generation unit 15 is configured to generate the target trajectory along which the vehicle 1 drives to the retreated position decided by the retreated position decision unit 17. For example, when the determination unit 14 determines that the communication is abnormal as described above, the trajectory generation unit 15 is configured to generate the target trajectory along which the vehicle 1 autonomously drives to the retracted position transmitted to the management center 20 immediately before the determination.

The vehicle control unit 16 includes, for example, the sensor 2, the ECU 5, and the actuator 6 mounted on the vehicle 1. For example, the vehicle control unit 16 causes the vehicle 1 to drive along the target trajectory generated by the trajectory generation unit 15 according to the recognition result of the driving environment by the recognition unit 11 and the map information and the empty vehicle information of the parking lot PA.

For example, the vehicle control unit 16 is configured to decelerate the vehicle 1 at the intersection XPT of the paths P1, P2, P3, P4, and P5 (see FIG. 3) in which the vehicle drives and accordingly decrease a steering angular speed. In the parking lot PA having the plurality of parking sections B1 and B2 as described above, the vehicle control unit 16 may be configured to decelerate the vehicle 1 from at a time when the vehicle 1 that is autonomously driving along a certain parking section B1 reaches the edge of the parking section B1 to a time when the vehicle moves the driving route along the next parking section B2.

The retreated position decision unit 17 includes, for example, the ECU 5 mounted on the vehicle 1. The retreated position decision unit 17 decides the retreated position of the vehicle 1 based on, for example, communication between the management center 20 and the communication unit 13 of the vehicle 1 and the driving environment recognized by the recognition unit 11. For example, the retreated position decision unit 17 is configured to transmit the decided retreated position to the management center 20 via the communication unit 13.

Next, each configuration of the vehicle control system 100 will be described in detail. The vehicle control system 100 includes, for example, a plurality of vehicle control devices 10 mounted on a plurality of vehicles 1. One vehicle control device 10 is mounted on one vehicle 1. The vehicle control system 100 may include one management center 20, or may include a plurality of management centers 20. For example, the management center 20 can be arranged for each country, region, prefecture, city, town, village, parking lot management company, or parking lot PA. When there is the plurality of management centers 20, the vehicle control device 10 mounted on the vehicle 1 communicates with the management center 20 that manages the parking lot PA in which the vehicle 1 is to be parked.

The management center 20 includes the center communication unit 21, the storage device 22, and the computing device 23 that decides the parking position of the vehicle 1. The center communication unit 21 includes, for example, a transmitter and a receiver, and communicates with the communication unit 13 of the vehicle control device 10. The center communication unit 21 is configured to communicate with the communication units 13 of the plurality of vehicle control devices 10 through, for example, road-to-vehicle communication or a wireless base station.

The storage device 22 includes, for example, a register, a cache memory, a primary storage device such as a main memory, a secondary storage device such as a hard disk, and an online storage. The storage device 22 has, for example, map information and empty vehicle information of one or a plurality of parking lots PA that the vehicle 1 moves in and out. The computing device 23 includes, for example, a CPU, an arithmetic logic unit (ALU), an adder, and a multiplier. The computing device 23 decides the parking position of the vehicle 1 based on, for example, the positional information of the vehicle 1, the map information and the empty vehicle information of the parking lot PA.

The computing device 23 may include a center determination unit 23a that determines whether or not a communication failure with the vehicle 1 occurs. In this case, the center communication unit 21 receives the retreated position transmitted from the vehicle 1 via the communication unit 13, and the storage device 22 records the retreated position received by the center communication unit 21. When the center determination unit 23a determines that the communication is abnormal, the computing device 23 estimates, as the position of the vehicle 1, the retreated position stored in the storage device 22 immediately before the determination.

Figure 3:
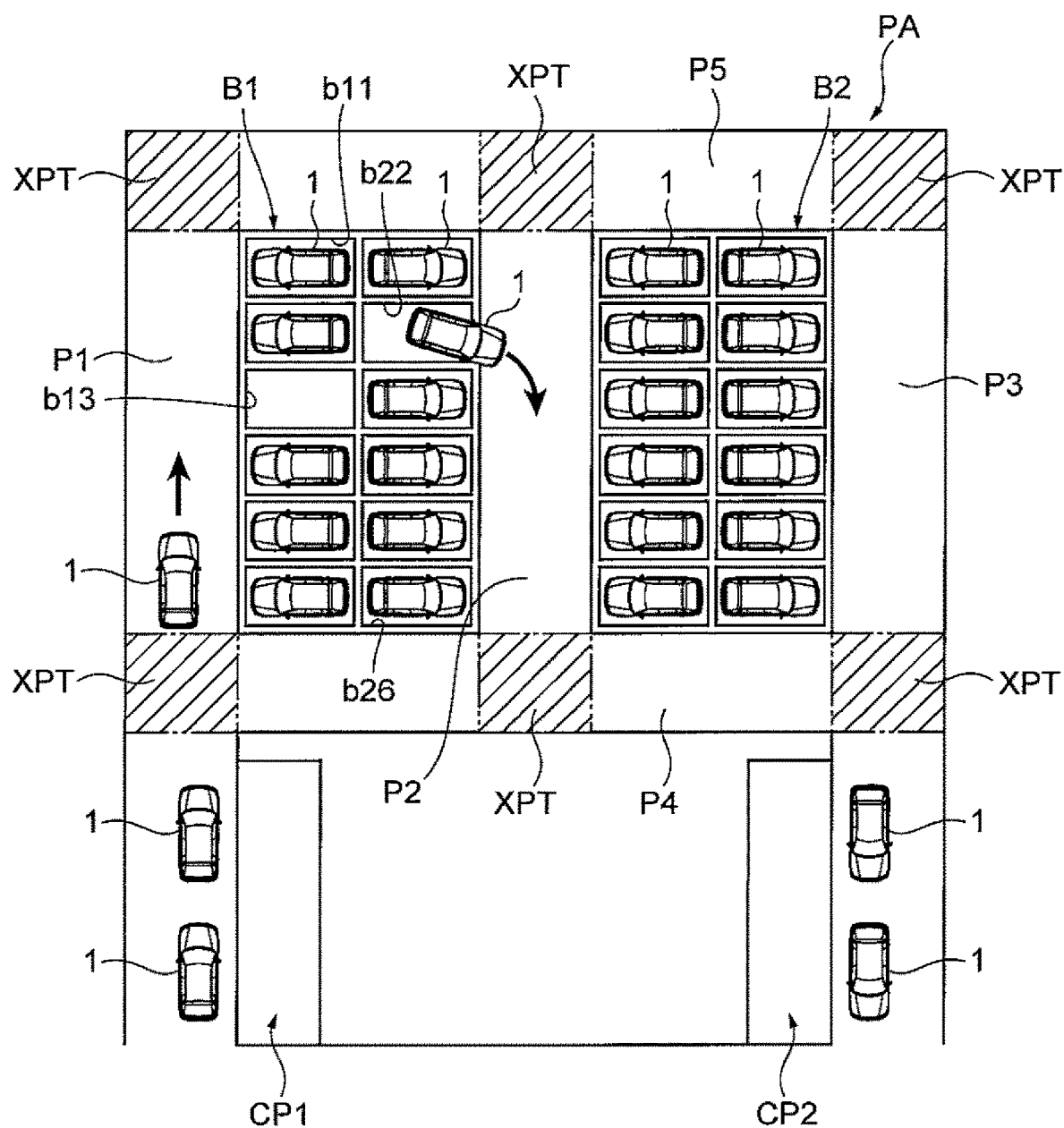
FIG. 3 is a schematic plan view illustrating an example of a parking lot in which the vehicle is parked.
Figure 4:
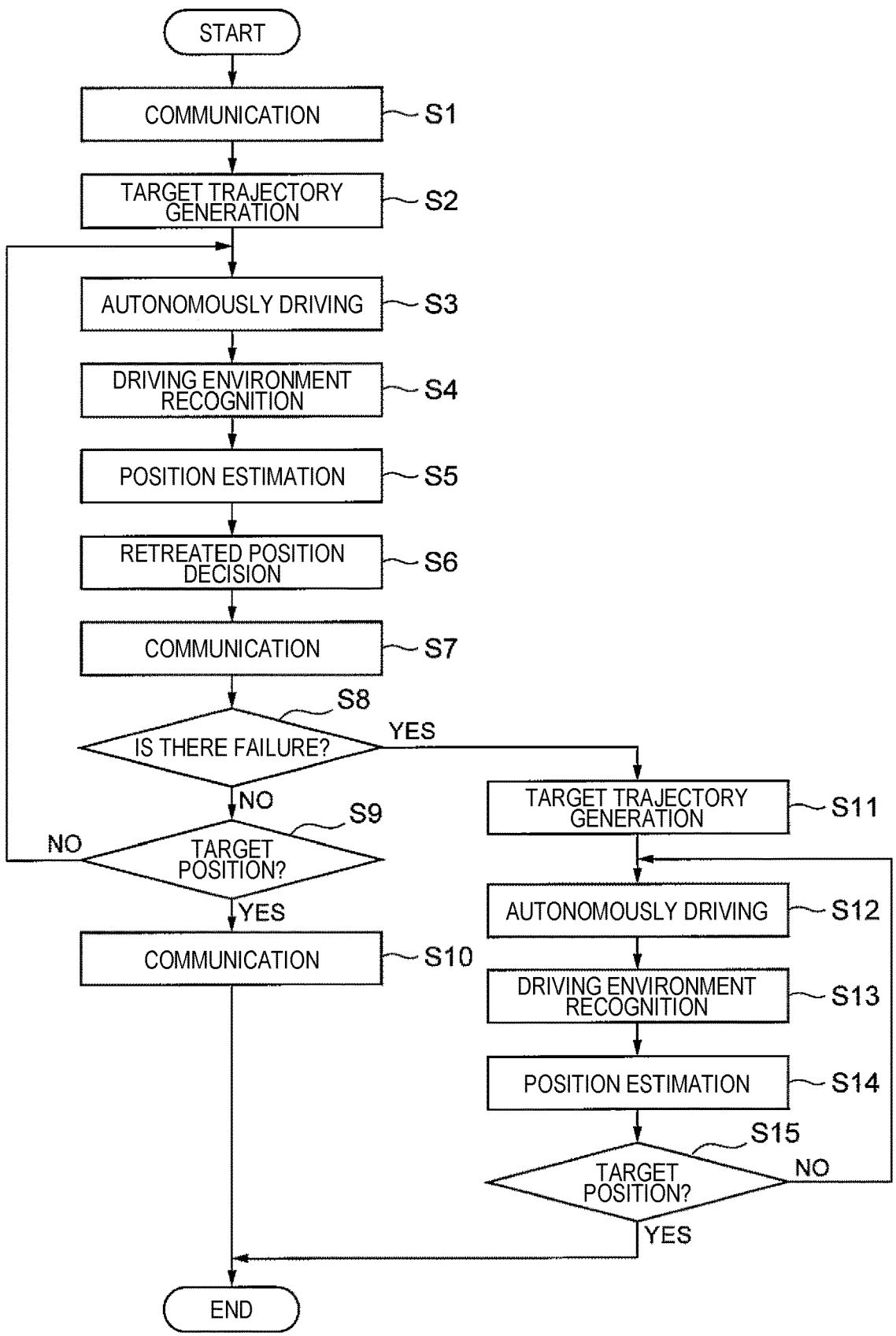
FIG. 4 is a flowchart for describing operations of the vehicle control device and the vehicle control system of FIG. 2.

Hereinafter, operations of the vehicle control device 10 and the vehicle control system 100 according to the present embodiment will be described. FIG. 3 is a schematic plan view illustrating an example of the parking lot PA in which the vehicle 1 having the vehicle control device 10 mounted thereon is parked. FIG. 4 is a flowchart for describing an example of the operations of the vehicle control device 10 and the vehicle control system 100 illustrated in FIG. 2.

In the example illustrated in FIG. 3, the parking lot PA includes an alighting porch CP1, a riding porch CP2, a first parking section B1, a second parking section B2, a first path P1, a second path P2, a third path P3, a fourth path P4, and a fifth path P5. Each of the first parking section B1 and the second parking section B2 has a plurality of parking frames b11, . . . , and b26 arranged in an array of 6 rows in a depth direction of the parking lot PA and two columns in a width direction of the parking lot PA.

The first path P1, the second path P2, and the third path P3 extend in the depth direction of the parking lot PA, and the fourth path P4 and the fifth path P5 extend in the width direction of the parking lot PA. The first path P1, the second path P2, and the third path P3 have the intersection XPT with the fourth path P4 and the fifth path P5. The first path P1, the third path P3, the fourth path P4, and the fifth path P5 form a rectangular ring orbital path surrounding the first parking section B1 and the second parking section B2. The second path P2 extends between the first parking section B1 and the second parking section B2.

For example, when auto valet parking in which the vehicle 1 which is the autonomous vehicle having the vehicle control device 10 mounted thereon automatically moves in and out from the parking lot PA is performed, an occupant who tries to move the vehicle 1 in the parking lot stops the vehicle 1 at the alighting porch CP1 and alights from the vehicle. The vehicle control device 10 of the vehicle 1 in which the occupant alights and there is no person performs communication between the communication unit 13 and the center communication unit 21 of the management center 20 (step S1).

Accordingly, the vehicle control device 10 receives the map information, the empty vehicle information, and the information on the parking position of the parking lot PA from the management center 20 via the communication unit 13.

The management center 20 receives, via the center communication unit 21, the positional information and the information such as the speed, the acceleration, and the angular acceleration of the vehicle 1 transmitted from the vehicle control device 10 of the vehicle 1 via the communication unit 13.

In the example illustrated in FIG. 3, the parking frame b13 in the first column and the third row of the first parking section B1 is empty. The vehicle 1 moves out, and thus, the parking frame b22 in the second row and the second column of the first parking section B1 is about to be empty. In this case, for example, the management center 20 recognizes a state in which the parking frame b22 in the second column and the second row of the first parking section B1 is empty, the vehicle 1 that moves in, and the positional information of the vehicle 1 through the communication with a sensor that is provided in the parking lot PA to detect the vehicle 1 being parked and the vehicle 1 that moves out.

For example, the management center 20 decides, as the parking position of the vehicle 1 to be parked, the parking frame b22 in the second column and the second row of the first parking section B1 that becomes empty due to the moving-out of the vehicle 1 by the computing device 23. This parking position is an example, and the computing device 23 of the management center 20 selects any parking position based on, for example, a condition that can optimize parking efficiency. The management center 20 transmits the decided parking position to the vehicle 1 to be parked by communicating with the communication unit 13 of the vehicle 1 via the center communication unit 21 (step S1).

The vehicle control device 10 that receives the parking position via the communication unit 13 causes the trajectory generation unit 15 to generate the target trajectory at which the vehicle 1 autonomously drives (Step S2). For example, the trajectory generation unit 15 refers to the map information and the empty vehicle information of the parking lot PA and the information on the parking position received via the communication unit 13 and the current position and the driving environment of the vehicle 1 recognized by the recognition unit 11. The trajectory generation unit 15 generates the target trajectory along which the vehicle 1 autonomously drives from the current position to the parking position based on the referred information.

More specifically, for example, as described above, the vehicle control device 10 receives, as the parking position, the positional information of the parking frame b22 in the second column and the second row of the first parking section B1 via the communication unit 13 (Step S1). For example, the vehicle control device 10 causes the trajectory generation unit 15 to generate the target trajectory along which the vehicle 1 passes through the second path P2 via the first path P1 and the fifth path P5 from the alighting porch CP1 and reaches the parking frame b22 which is the parking position (step S2). This target trajectory is an example, and the trajectory generation unit 15 can generate any target trajectory based on, for example, the condition that can optimize the parking efficiency.

Subsequently, in the vehicle control device 10, the vehicle control unit 16 causes the vehicle 1 to drive along the target trajectory (step S3), and the recognition unit 11 recognizes the driving environment including the paths P1, . . . , and P5, white lines, the parking sections B1 and B2, the parking frames b11, . . . , and b26, other vehicles 1, curbs, bollards, sidewalks, walls, columns, poles, guardrails, pedestrians, and other obstacles around the vehicle 1 (step S4). For example, the vehicle control device 10 causes the estimation unit 12 to estimate the current position of the vehicle 1 based on the map information and the empty vehicle information of the parking lot PA received via the communication unit 13 and the position of the vehicle 1 and the driving environment obtained by the recognition unit 11 (step S5). The autonomous driving of the vehicle 1 (step S3), the recognition of the driving environment (step S4), and the estimation of the position of the vehicle 1 (step S5) can be simultaneously performed.

More specifically, for example, the vehicle control device 10 causes the vehicle control unit 16 to cause the vehicle 1 to drive along the target trajectory along which the vehicle 1 passes through the second path P2 via the first path P1 and the fifth path P5 from the alighting porch CP1 and reaches the parking frame b22 which is the parking position (step S3). At this time, for example, the vehicle control device 10 causes the recognition unit 11 to recognize that the parking frame b13 in the first column and the third row of the first parking section B1 is empty by recognizing the driving environment around the vehicle 1 (step S4). For example, the vehicle control device 10 causes the estimation unit 12 to estimate that the current position of the vehicle 1 is on the first path P1 and is a position in front of the parking frame b13 in the first column and the third row of the first parking section B1 (step S5).

Subsequently, the vehicle control device 10 causes the retreated position decision unit 17 to decide the retreated position of the vehicle 1 based on, for example, the communication between the communication unit 13 and the management center 20 and the driving environment recognized by the recognition unit 11 (Step S6). More specifically, for example, the retreated position decision unit 17 decides, as the retreated position of the vehicle 1, the parking frame b13 in the first column and the third row of the first parking section B1 which is empty near the position of the vehicle 1. This retreated position is an example, and the retreated position decision unit 17 can decide any retreated position based on, for example, the condition that can optimize the parking efficiency.

Subsequently, the vehicle control device 10 performs the communication via the communication unit 13, and transmits the retreated position decided by the retreated position decision unit 17 to the management center 20 (step S7). The management center 20 records the retreated position of the vehicle 1 received via the center communication unit 21 in the storage device 22. Subsequently, the vehicle control device 10 causes the determination unit 14 to determine whether or not the communication failure occurs between the communication unit 13 and the management center 20 (step S8). For example, when the determination unit 14 determines that there is no communication failure (NO), the vehicle control device 10 compares the current position of the vehicle 1 estimated by the estimation unit 12 with the target trajectory generated by the trajectory generation unit 15, and determines whether or not the vehicle reaches the parking frame b22 as the parking position which is the target position (step S9).

When the vehicle does not reach the target position (NO) as the result of the determination (step S9) of whether or not the vehicle reaches the target position, the vehicle control device 10 repeats the steps from the autonomous driving (step S3) to the determination (step S8) of whether or not there is the communication failure.

As a result, the retreated position of the vehicle 1 is updated to the parking frame b11, ..., and b26 near the current position of the vehicle 1 which are optimum to improve the parking efficiency at any time based on the latest driving environment recognized by the recognition unit 11, the current position of the vehicle 1, and the latest communication between the management center 20 and the communication unit 13 of the vehicle control device 10.

When it is determined that the vehicle reaches the target position (YES) as the result of the determination (step S9) of whether or not the vehicle reaches the target position, the vehicle control device 10 transmits information indicating that the vehicle reaches the parking position which is the target position to the management center 20 via the communication unit 13 (step S10).

The management center 20 updates the empty vehicle information of the parking lot PA based on the information received via the center communication unit 21, for example. Thus, parking of the vehicle 1 by the vehicle control device 10 and the vehicle control system 100 is completed.

When the determination unit 14 determines that the communication failure occurs (YES) as the result of the determination (step S8) of whether or not the communication failure occurs between the communication unit 13 and the management center 20, the vehicle control device 10 causes the trajectory generation unit 15 to generate the target trajectory along which the vehicle 1 drives to the retreated position (step S11). Subsequently, in the vehicle control device 10, the vehicle control unit 16 causes the vehicle 1 to drive along the target trajectory (step S12), and the recognition unit 11 recognizes the driving environment around the vehicle 1 (step S13), and the estimation unit 12 estimates the current position of the vehicle 1 (step S14). The autonomous driving of the vehicle 1 (step S12), the recognition of the driving environment (step S13), and the estimation of the position of the vehicle 1 (step S14) can be simultaneously performed as in steps S3 to S5.

Subsequently, for example, the vehicle control device 10 compares the current position of the vehicle 1 estimated by the estimation unit 12 with the target trajectory generated by the trajectory generation unit 15, and determines whether or not the vehicle reaches the retreated position that is the target position (step S15)

As a result, when the vehicle does not reach the target position (NO), the vehicle control device 10 repeats the steps from the autonomous driving (step S12) to the estimation of the current position of the vehicle 1 (step S14). When it is determined that the vehicle 1 reaches the retreated position that is the target position (YES) as the result of the determination (step S15) of whether or not the vehicle reaches the target position, the vehicle control device 10 causes the vehicle control unit 16 to stop the vehicle 1, and completes the retreating of the vehicle 1.

As described above, in the vehicle control device 10 and the vehicle control system 100 according to the present embodiment, the vehicle control device 10 include the recognition unit 11, the estimation unit 12, the communication unit 13, the determination unit 14, the trajectory generation unit 15, the vehicle control unit 16, and the retreated position decision unit 17. When the determination unit 14 determines that the communication is abnormal, the trajectory generation unit 15 is configured to generate the target trajectory along which the vehicle 1 drives to the retreated position.

With this configuration, it is possible to cause the vehicle 1 to drive from the position of the vehicle 1 when there is the communication failure between the vehicle 1 and the management center 20 to an appropriate retreated position near this position and to cause the vehicle to be repeated. Thus, even when there is the communication failure and the management center 20 cannot receive the positional information of the vehicle 1, the management center 20 can estimate that the vehicle 1 is retreating to the retreated position near the position at which there is the communication failure.

Thus, the position of the vehicle 1 can be estimated in a narrower range by the management center 20, and after the occurrence of the communication failure between the vehicle 1 and the management center 20, it is not necessary to restrict the moving-in and -out of other vehicles 1 over the target trajectory of the vehicle 1. Accordingly, vehicles 1 other than the vehicle 1 in which the communication failure occurs can efficiently move in and out, and the efficiency and reliability of the auto valet parking can be improved.

For example, in the vehicle control device 10 and the vehicle control system 100 according to the present embodiment, the retreated position decision unit 17 of the vehicle control device 10 is configured to transmit the retreated position to the management center 20 via the communication unit 13 as described above. For example, when the determination unit 14 determines that the communication is abnormal, the trajectory generation unit 15 of the vehicle control device 10 is configured to generate the target trajectory for causing the vehicle 1 to drive to the retreated position transmitted to the management center 20 immediately before the determination.

With this configuration, the retreated position of the vehicle 1 after the occurrence of the communication failure can be shared by the management center 20 and the vehicle control device 10, and the other vehicles 1 can be efficiently moved in and out based on the shared retreated position of the vehicle 1. Accordingly, the efficiency and reliability of the auto valet parking can be further improved.

For example, in the vehicle control device 10 and the vehicle control system 100 according to the present embodiment, the communication unit 13 of the vehicle control device 10 is configured to shorten the communication period at the intersection XPT of the paths along which the vehicle 1 drives.

With this configuration, for example, when the vehicle 1 is passing through the intersection XPT, the retreated position can be decided in a shorter period, and the retreated position can be transmitted to the management center 20. Thus, even when the communication failure occurs between the vehicle 1 passing through the intersection XPT having a plurality of branches and the management center 20, the retreated position and the target trajectory of the vehicle 1 can be more accurately estimated by the management center 20. Accordingly, the efficiency and reliability of the auto valet parking can be further improved.

For example, in the vehicle control device 10 and the vehicle control system 100 according to the present embodiment, the determination unit 14 of the vehicle control device 10 is configured to shorten the period of the determination at the intersection XPT of the paths along which the vehicle 1 drives.

With this configuration, for example, when the vehicle 1 is passing through the intersection XPT, it is possible to determine the occurrence of the communication failure in a shorter period. Accordingly, even though the communication failure occurs between the vehicle 1 passing through the intersection XPT having the plurality of branches and the management center 20, the occurrence of the communication failure is determined in a shorter time, and the retreated position and the target trajectory of the vehicle 1 can be more accurately estimated by the management center 20. Accordingly, the efficiency and reliability of the auto valet parking can be further improved.

For example, in the vehicle control device 10 and the vehicle control system 100 according to the present embodiment, the vehicle control unit 16 of the vehicle control device 10 is configured to decelerate the vehicle 1 at the intersection XPT of the paths along which the vehicle 1 drives.

With this configuration, for example, even though the communication failure occurs between the vehicle 1 passing through the intersection XPT having the plurality of branches and the management center 20, the amount of movement of the vehicle 1 in a state in which the position of the vehicle 1 cannot be received by the management center 20 can be reduced. Accordingly, the retreated position and the target trajectory of the vehicle 1 after the occurrence of the communication abnormality can be more accurately estimated by the management center 20. Accordingly, the efficiency and reliability of the auto valet parking can be further improved.

The vehicle control system 100 according to the present embodiment includes the vehicle control device 10 and the management center 20 that manages the vehicle 1 having the vehicle control device 10 mounted thereon. The management center 20 includes the center communication unit 21 that communicates with the communication unit 13 of the vehicle control device 10, the storage device 22 that has the map information of the parking lot PA that the vehicle 1 moves in and out, and the computing device 23 that decides the parking position of the vehicle 1.

With this configuration, the management center 20 communicates with the communication unit 13 of the vehicle control device 10 via the center communication unit 21, and can receive, for example, the information such as the position, the speed, the acceleration, the angular acceleration, the parking position, the retreated position, and the target trajectory of the vehicle 1 from the vehicle control device 10. The management center 20 can decide the parking position of the vehicle 1 by a calculation unit based on, for example, the received position of the vehicle 1 and the map information and the empty vehicle information of the parking lot PA stored in the storage device 22. The management center 20 communicates with the communication unit 13 of the vehicle control device 10 via the center communication unit 21, and can transmit, for example, the map information, the empty vehicle information, and the parking position of the parking lot PA or the information such as the target trajectory from the current position to the parking position to the vehicle control device 10.

In the vehicle control system 100 according to the present embodiment, the computing device 23 includes, for example, the center determination unit 23a that determines whether or not the communication failure with the vehicle 1 occurs. For example, the center communication unit 21 receives the retreated position transmitted from the vehicle 1 via the communication unit 13. The storage device 22 records, for example, the retreated position of the vehicle 1 received by the center communication unit 21. For example, when the center determination unit 23a determines that the communication is abnormal, the computing device 23 is configured to estimate, as the position of the vehicle 1, the retreated position stored in the storage device 22 immediately before the determination.

With this configuration, the retreated position of the vehicle 1 after the occurrence of the communication failure can be shared by the management center 20 and the vehicle control device 10, and the other vehicles 1 can be efficiently parked based on the shared retreated position of the vehicle 1. Accordingly, the efficiency and reliability of the auto valet parking can be further improved.

As described above, according to the present embodiment, it is possible to provide the vehicle control device 10 and the vehicle control system 100 capable of improving the efficiency and reliability of the auto valet parking compared to the related art when the communication failure occurs.

Second Embodiment

Figure 5:
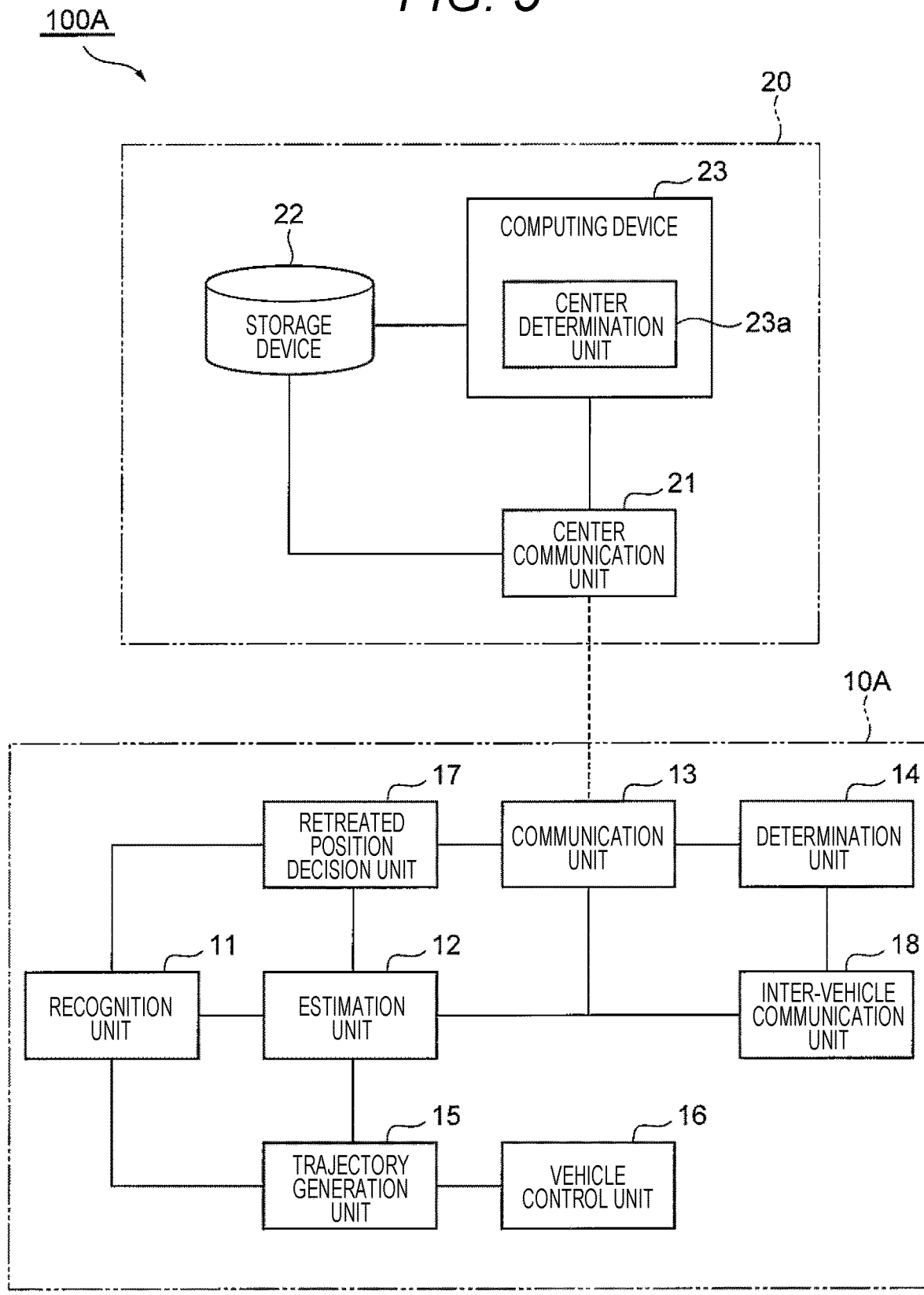
FIG. 5 is a block diagram of a vehicle control device and a vehicle control system according to a second embodiment.

Hereinafter, a vehicle control device and a vehicle control system 100A according to a second embodiment of the present disclosure will be described with reference to FIG. 5 by using FIGS. 1 and 3. FIG. 5 is a block diagram illustrating a schematic configuration of a vehicle control device 10A and the vehicle control system 100A according to the second embodiment of the present disclosure.

The vehicle control device 10A and the vehicle control system 100A according to the present embodiment are different from the vehicle control device 10 and the vehicle control system 100 according to the first embodiment in that the vehicle control device 10A includes an inter-vehicle communication unit 18. Other points of the vehicle control device 10A and the vehicle control system 100A according to the present embodiment are the same as those of the vehicle control device 10 and the vehicle control system 100 according to the first embodiment, and the same parts are assigned by the same reference signs. Thus, the description thereof will be omitted.

The vehicle control system 100A according to the present embodiment includes the inter-vehicle communication unit 18 in addition to the recognition unit 11, the estimation unit 12, the communication unit 13, the determination unit 14, the trajectory generation unit 15, the vehicle control unit 16, and the retreated position decision unit 17. The inter-vehicle communication unit 18 includes, for example, the communication device 4 and the ECU 5 of the vehicle 1, and employs a communication method different from that of the communication unit 13. More specifically, for example, Wi-Fi or Bluetooth (registered trademark) can be employed as the communication method of the inter-vehicle communication unit 18. The inter-vehicle communication unit 18 is configured to communicate with the inter-vehicle communication unit 18 of another vehicle 1 having the vehicle control device 10A mounted thereon.

Figure 6:
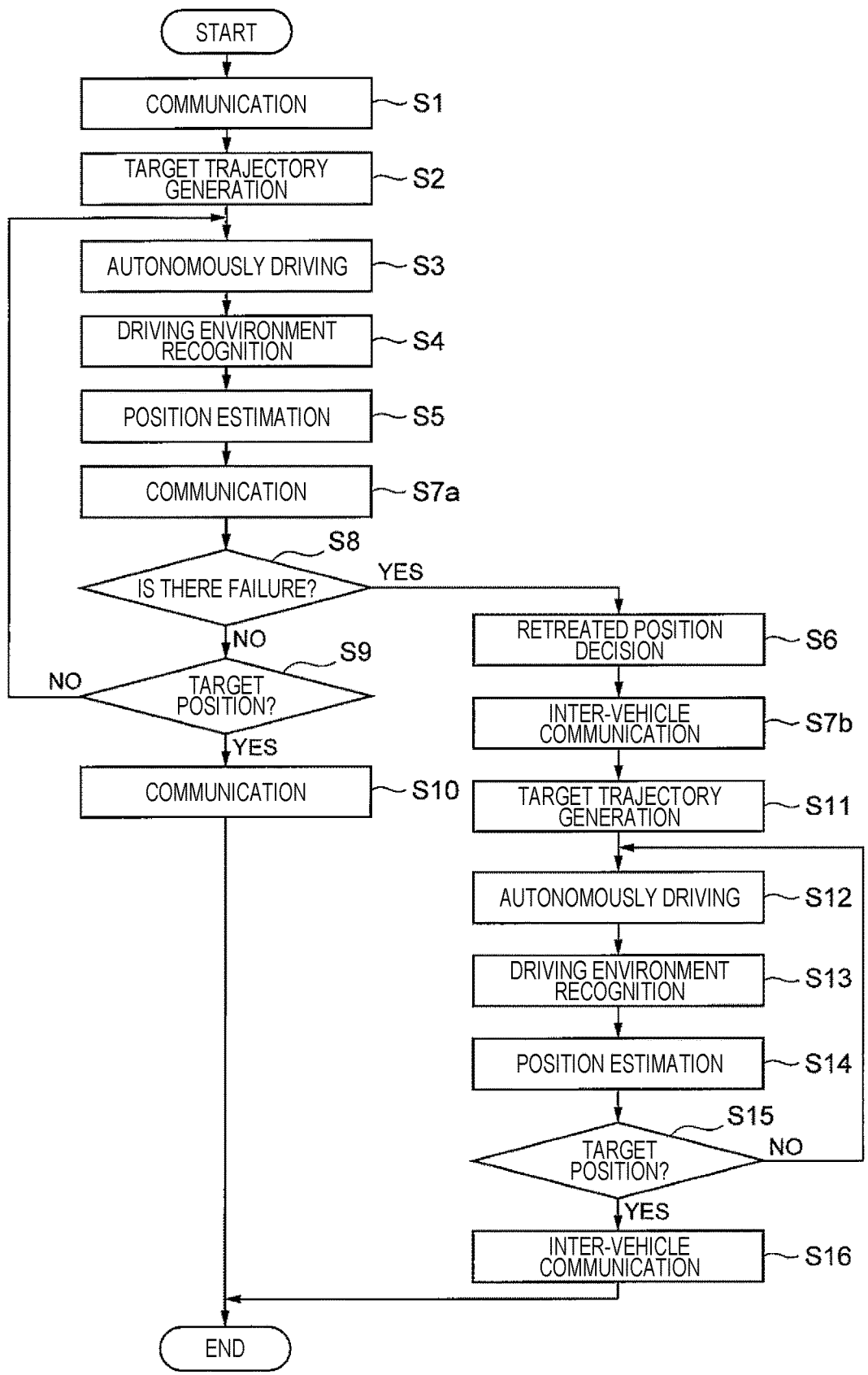
FIG. 6 is a flowchart for describing operations of the vehicle control device and the vehicle control system of FIG. 5.

Hereinafter, operations of the vehicle control device 10A and the vehicle control system 100A according to the present embodiment will be described. FIG. 6 is a flowchart for describing an example of the operations of the vehicle control device 10A and the vehicle control system 100A illustrated in FIG. 5. The same steps as those in the flowchart of the first embodiment illustrated in FIG. 4 are assigned by the same reference signs, and the description thereof will be omitted.

When the auto valet parking of the vehicle 1 having the vehicle control device 10A according to the present embodiment mounted thereon is performed, the steps from the communication (step S1) between the communication unit 13 and the center communication unit 21 of the management center 20 to the position estimation (step S5) of the vehicle 1 are the same as those in the first embodiment. In the present embodiment, for example, after the position estimation (step S5) of the vehicle 1, the information on the position of the vehicle 1 is transmitted by communicating with the center communication unit 21 of the management center 20 via the communication unit 13 without deciding the retreated position of the vehicle 1 (step S7a).

Subsequently, the vehicle control device 10A causes the determination unit 14 to determine whether or not the communication failure occurs between the communication unit 13 and the management center 20 (step S8). As a result, when it is determined that the communication failure occurs (YES), the retreated position of the vehicle 1 is decided as in the first embodiment (step S6). Subsequently, the vehicle control device 10A causes the inter-vehicle communication unit 18 to communicate with the inter-vehicle communication unit 18 of the vehicle control device 10A mounted on another vehicle 1 around the vehicle 1 (step S7b). More specifically, the vehicle control device 10A of the vehicle 1 in which the communication failure occurs transmit the information such as the position, the speed, the acceleration, the angular acceleration, the retreated position, and the target trajectory of the vehicle 1 in which the communication failure occurs to another vehicle 1 in which the communication failure does not occur via the inter-vehicle communication unit 18.

The vehicle 1 in which the communication failure does not occur transmits the information received from the vehicle 1 in which the communication failure occurs to the center communication unit 21 of the management center 20 via the communication unit 13 of the vehicle control device 10A. Accordingly, the management center 20 can receive various pieces of information of the vehicle 1 in which the communication failure occurs in the communication unit 13 via the vehicle 1 in which the communication failure does not occur in the communication unit 13. Thereafter, as in the first embodiment, the vehicle control device 10A generates the target trajectory (step S11), causes the vehicle 1 to autonomously drive (step S12), recognizes the driving environment (step S13), and estimates the position of the vehicle 1 (step S14), and determines that the vehicle reaches the target position (step S15).

For example, when it is determined that the vehicle reaches the retreated position that is the target position (YES) as the result of the determination (S15) of whether or not the vehicle reaches the target position, the vehicle control device 10A transmits information indicating that the vehicle reaches the retreated position which is the target position to the vehicle 1 in which the communication failure does not occur in the communication unit 13 via the inter-vehicle communication unit 18 (step S16). The vehicle 1 in which the communication failure does not occur in the communication unit 13 transmits the information received from the vehicle 1 in which the communication failure occurs in the communication unit 13 to the center communication unit 21 of the management center 20 via the communication unit 13 of the vehicle control device 10A. The management center 20 updates the empty vehicle information of the parking lot PA based on the information received via the center communication unit 21, for example. As described above, the retreating of the vehicle 1 due to the vehicle control device 10A and the vehicle control system 100A is completed.

The vehicle control device 10A and the vehicle control system 100A according to the present embodiment include the inter-vehicle communication unit 18 that enables the vehicle control device 10A to perform communication between the vehicle 1 and another vehicle 1. When the determination unit 14 determines that the communication of the communication unit 13 is abnormal, the inter-vehicle communication unit 18 is configured to transmit the position and speed of the vehicle 1 to another vehicle 1. With this configuration, even when the communication failure occurs in the communication unit 13 of the vehicle control device 10A, the information can be transmitted to and received from the management center 20 via the communication unit 13 of the vehicle control device 10A of another vehicle 1. Accordingly, according to the vehicle control device 10A and the vehicle control system 100A according to the present embodiment, the same effects as those of the vehicle control device 10 and the vehicle control system 100 according to the above-described first embodiment can be obtained.

While the embodiments of the present disclosure have been described in detail with reference to the drawings, the detailed configurations are not limited to these embodiments, and even changes in design without departing from the gist of the present disclosure are included in the present disclosure. For example, although it has been described in the above-described embodiments that the auto valet parking in which the unmanned self-driving vehicle autonomously drives and moves in and out of the parking lot, the applications of the vehicle control device and the vehicle control system according to the present disclosure are not limited to the auto valet parking.

The vehicle control device and the vehicle control system according to the present disclosure are applicable to normal autonomous driving of an autonomous vehicle that communicates with an external facility of a vehicle including a management center.

According to the vehicle control device and the vehicle control system of the present disclosure, when the communication failure occurs between the autonomous vehicle that is autonomously driving and the external facility, the autonomous vehicle can be automatically stopped at a safe retreated position.

REFERENCE SIGNS LIST 1 vehicle
10 vehicle control device
10A vehicle control device
11 recognition unit
12 estimation unit
13 communication unit
14 determination unit
15 trajectory generation unit
16 vehicle control unit
17 retreated position decision unit
18 Inter-vehicle communication unit
20 management center (external facility)
21 center communication unit
22 storage device
23 computing device
23a center determination unit
100 vehicle control system
100A vehicle control system
b13 parking frame (retreated position)
b22 parking frame (parking position)
P1 path
P2 path
P3 path
P4 path
P5 path
XPT intersection

The invention claimed is:

1. A vehicle control device mounted on a vehicle, the device comprising:
a recognition unit that recognizes a driving environment around the vehicle;
an estimation unit that estimates a position of the vehicle based on the driving environment;
a communication unit that communicates with an external facility of the vehicle;
a determination unit that determines whether or not a failure occurs in the communication;
a trajectory generation unit that generates a target trajectory along which the vehicle autonomously drives;
a vehicle control unit that causes the vehicle to drive along the target trajectory; and
a retreated position decision unit that decides a retreated position of the vehicle based on the communication and the driving environment,
wherein the trajectory generation unit generates the target trajectory along which the vehicle drives to the retreated position when the determination unit determines that the communication is abnormal; and
wherein
the retreated position decision unit transmits the retreated position to the external facility via the communication unit, and
the trajectory generation unit generates the target trajectory along which the vehicle drives to the retreated position transmitted to the external facility immediately before the determination when the determination unit determines that the communication is abnormal.

2. The vehicle control device according to claim 1, wherein the communication unit reduces a period of the communication at an intersection of paths along which the vehicle drives.

3. The vehicle control device according to claim 1, wherein the determination unit reduces a period of the determination at an intersection of paths along which the vehicle drives.

4. The vehicle control device according to claim 1, wherein the vehicle control unit decelerates the vehicle at an intersection of paths along which the vehicle drives.

5. The vehicle control device according to claim 1, further comprising:
an inter-vehicle communication unit that performs communication between the vehicle and another vehicle,
wherein the inter-vehicle communication unit transmits a position and a speed of the vehicle to the other vehicle when the determination unit determines that the communication of the communication unit is abnormal.

6. A vehicle control system comprising:
the vehicle control device according to claim 1; and
a management center that manages the vehicle,
wherein the management center includes a center communication unit that communicates with the communication unit, a storage device that has map information of a parking lot that the vehicle is moved in and out, and a computing device that decides a parking position of the vehicle.

7. The vehicle control system according to claim 6, wherein
the computing device includes a center determination unit that determines whether or not a failure occurs in the communication with the vehicle,
the center communication unit receives the retreated position transmitted from the vehicle via the communication unit,
the storage device records the retreated position received by the center communication unit, and
the computing device estimates, as a position of the vehicle, the retreated position stored in the storage device immediately before the determination when the center determination unit determines that the communication is abnormal.

* * * * *